United States Patent [19]

Kühl et al.

[11] 4,418,452

[45] Dec. 6, 1983

[54] X-RAY DETECTOR

[75] Inventors: Walter H. Kühl; Johannes A. J. Van Leunen; Bart van der Eijk; Antonius J. J. M. van der Bolt; Arthur M. E. Hoeberechts, all of Eindhoven, Netherlands

[73] Assignee: U.S. Philips Corporation, New York, N.Y.

[21] Appl. No.: 79,909

[22] Filed: Sep. 28, 1979

Related U.S. Application Data

[62] Division of Ser. No. 885,670, Mar. 13, 1978, abandoned.

[30] Foreign Application Priority Data

Mar. 28, 1977 [NL] Netherlands .......................... 7703294

[51] Int. Cl.³ .............................................. H01J 9/12
[52] U.S. Cl. ......................................... 445/35; 445/28
[58] Field of Search ................ 29/25.13, 25.14; 316/4; 427/74, 75, 76

[56] References Cited

U.S. PATENT DOCUMENTS

| 3,026,412 | 3/1962 | Carlson | 250/367 |
| 3,604,776 | 9/1971 | Kron | 316/4 |
| 3,866,047 | 2/1975 | Hounsfield | 250/360 |
| 3,919,556 | 11/1975 | Berninger | 250/363 S |
| 4,069,421 | 1/1978 | Bourdel | 250/370 |

Primary Examiner—Howard N. Goldberg
Assistant Examiner—K. J. Ramsey
Attorney, Agent, or Firm—Thomas A. Briody; Robert T. Mayer; Jack E. Haken

[57] ABSTRACT

A method of manufacturing light detection units which comprise a photocathode disposed on an entrance window, an electron detector including a semiconductor junction, and means which transmit the electrons from the photocathode to the electron detector including a perforated aperture plate disposed between the entrance window and the electron detector. The photocathode is formed on a surface of the entrance window after assembling the entrance window and electron detector to the means which transmit the electrons. Perforations in the aperture plate are covered with spherical shields while the photocathode is formed on the surface of the entrance window. The shields are then removed.

1 Claim, 11 Drawing Figures

X-RAY DETECTOR

This is a division of application Ser. No. 885,670, filed Mar. 13, 1978, now abandoned.

The invention relates to a radiation detector, comprising a scintillation element and an intensifying light detector device which detects light produced in the scintillation element.

A prior art radiation detector of this kind is known from U.S. Pat. No. 3,866,047. An X-ray detector described therein comprises a series of scintillation crystals, a photomultiplier being coupled to each scintillation crystal. The photomultipliers are alternately arranged opposite three different surfaces of the scintillation crystals. A radiation detector can thus be realized in which the center-to-center distance of adjacent channels is, for example, 8 mm. Upon detection of X-radiation, a difference is liable to occur between the channels, notably between channels which are read out laterally and those which are read out in the forward direction. The stability of the photomultiplier tubes used is not sufficient for all applications, notably when measured over a prolonged period of time. Correction in this respect is very complex. Moreover, the dimensions of the photomultiplier tubes used are such that the resolution in the line direction of the detectors is insufficient for given applications, in spite of the alternating arrangement. Furthermore, the use of photomultiplier tubes implies an excessive limitation of the dynamic range of the detector for many applications.

An object of the invention is to eliminate these drawbacks; to this end, in a radiation detector of the invention the light detection device scintillation light comprises a photocathode, an electron-optical system and a semiconductor electron detector with internal intensification.

In a detector in accordance with the invention scintillation light detectors in the form of photomultiplier tubes are replaced by a system in which photoelectrons generated by the scintillation light are accelerated and subsequently detected by a semiconductor electron detector having internal intensification. The stability as well as the sensitivity and the dynamic range of the radiation detector are thus substantially improved. Detectors in accordance with the invention can be combined, for example, as modules comprising a plurality of detection channels in a common housing, in order to form a multiple detector device having a comparatively small center-to-center distance between the channels. The detector modules in a preferred embodiment of the invention are detachably mounted, with or without the associated scintillation elements so that if one of the channels should become defective only the relevant module need be replaced.

The detector module of a further preferred embodiment consists of a housing comprising a number of windows for the scintillation light on one side, an inner surface of said windows supporting a photocathode. An electrode system which is disposed in the housing projects photoelectrons emitted by the photocathode onto an active surface area of a semiconductor electron detector.

The semiconductor detector of a further preferred embodiment contains a block of silicon having a pn transition which is situated at a comparatively small distance below the surface. The semiconductor detector is shielded of alkali elements from the photocathode by, for example, a polyimide layer or by a protective sealing layer of silicon nitride.

For the sake of clarity, the term light is used herein to mean the scintillation radiation which is prduced in the scintillation element by the detected radiation, however, this does not imply a restriction to the visible wavelength range, but may also cover radiation which is situated outside this range, notably ultraviolet radiation.

Some preferred embodiments of detectors in accordance with the invention will be described in detail hereinafter with reference to the accompanying diagrammatic drawing.

Figure 3:
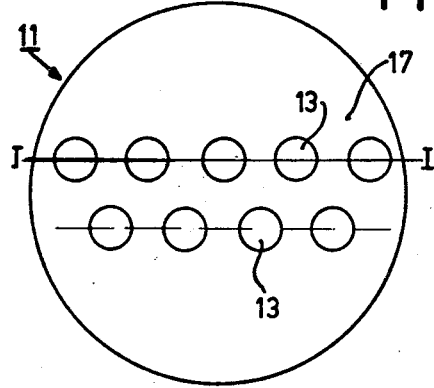
Figure 4:
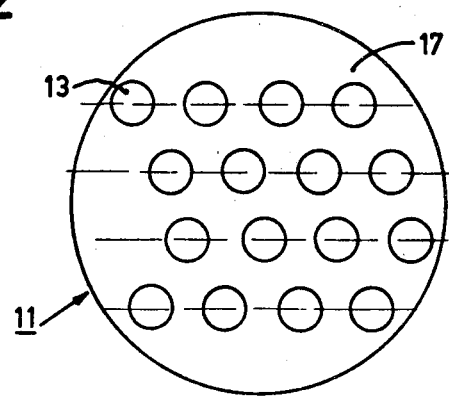

FIGS. 3 and 4 are front views of detector modules, comprising 9 and 16 light detection channels, respectively.

Figure 5:
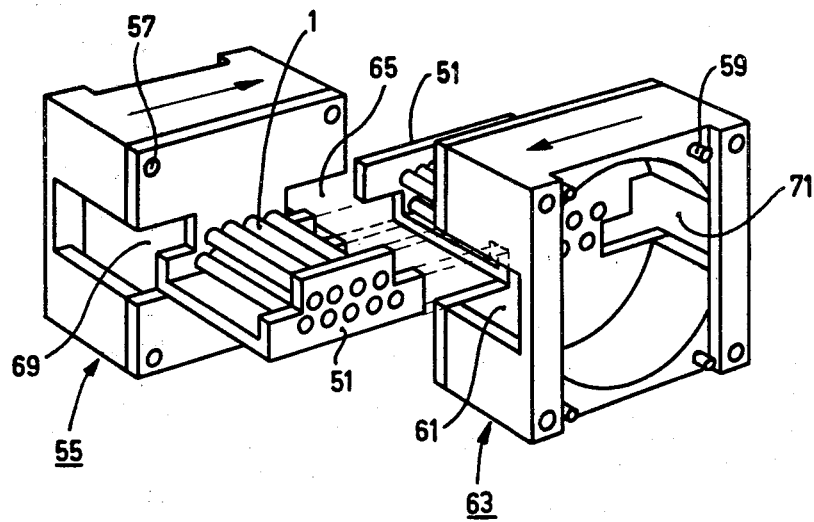
Figure 6:
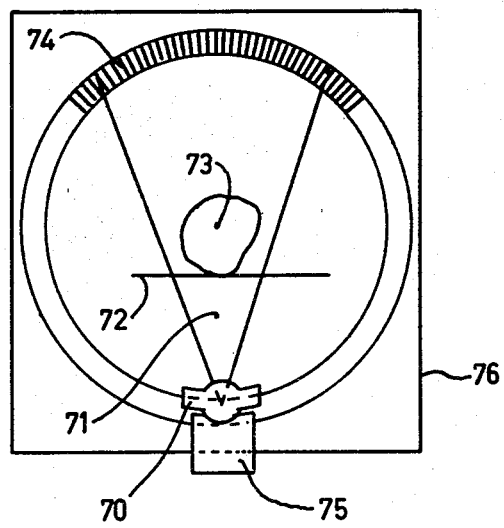

FIG. 5 is a perspective view of a preferred modular construction of a detector in accordance with the invention, and FIG. 6 shows a scanning X-ray examining apparatus, comprising a detector in accordance with the invention.

Figure 7:
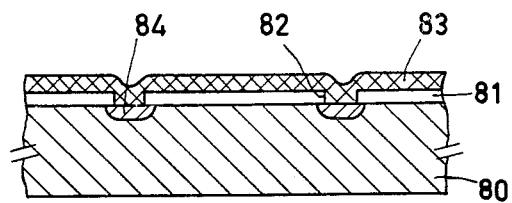
Figure 8:
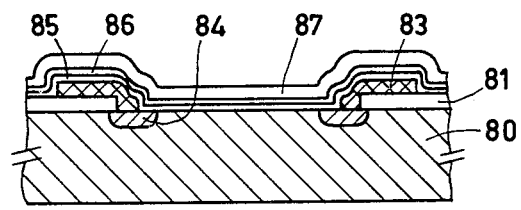
Figure 9:
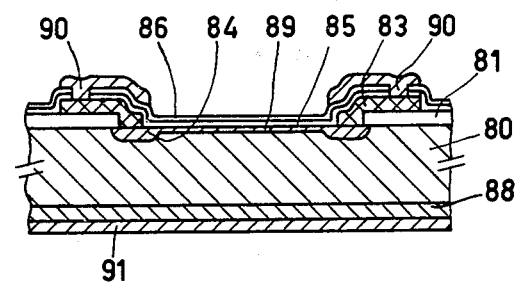
Figure 10:
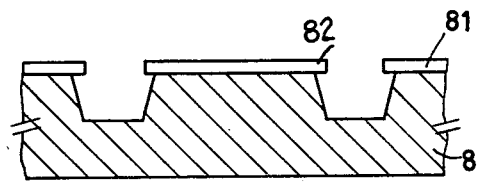
Figure 11:
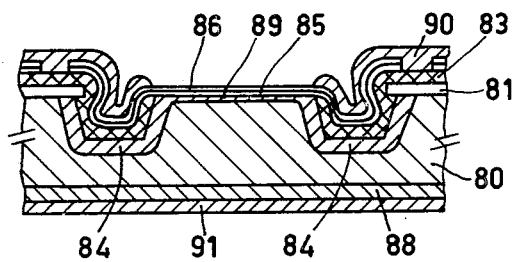

FIGS. 7 to 9 are diagrammatic cross-sectional view of successive stages of manufacture of a semiconductor electron detector with a nitride protecting layer according to the invention, and FIGS. 10 and 11 are cross-sectional views in two successive stages of manufacture of a modified embodiment of the electron detector shown in FIGS. 7 to 9.

Figure 1:
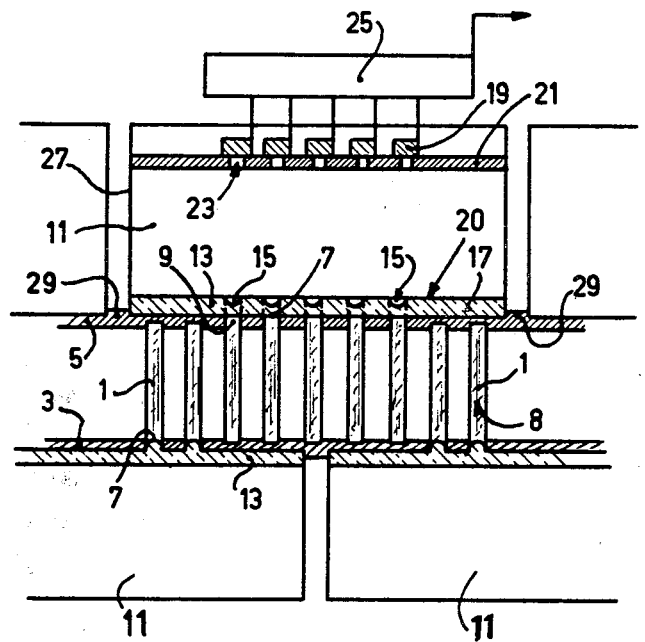
FIG. 1 is a sectional view of a part of a detector in accordance with the invention.

A detector device in accordance with the invention as diagrammatically shown in FIG 1 comprises a series of scintillation elements 1 which are mounted between supports 3 and 5. The scintillation elements may be made, for example, of crystals of NaI, CsI, $Bi_4Ge_3O_{12}$ or of one of the materials stated in U.S. patent application Ser. No. 885,669, filed Mar. 13, 1978; (now U.S. Pat. No. 4,185,201) that is, cerium activated yttrium phosphors including: $Y_2SiO_5$:Ce, $Y_2Si_2O_7$:Ce and $Y_3Al_5O_{12}$:Ce. Use can also be made of scintillation elements in which a powdery scintillation material is buried in a suitable support of, for example, glass or a synthetic material which has a low absorption factor for the scintillation light. Powdery scintillation material can also be used as a powder/liquid mixture contained in a holder, as a cover layer on a transparent support which acts as a light conductor, or in a sintered condition having adequate transparency.

Figure 2:
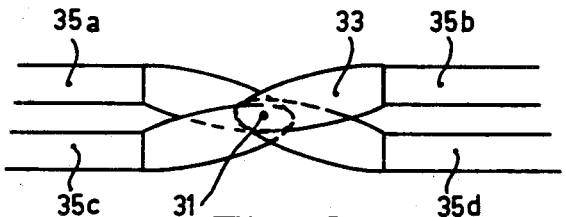
FIG. 2 shows a preferred embodiment of light conductor scintillation elements wherein a single row of scintillation elements is converted into a multiple series of read out channels.

The scintillation elements are laterally read out, i.e. via end faces 7. All side faces which are not irradiated read out are shielded to reduce cross-talk, by a layer which absorbs the detected radiation and which is impermeable to the scintillation light (i.e. preferably an internal reflective layer). The cover layer is transparent to radiation at the front faces 8 which receive the detected radiation. Preferably no cover layer is provided on the faces which are read out, because these faces must be suitable to transmit as much luminescent light as possible. A radiation absorbing material may be provided between the scintillation elements so that the scintillation elements are protected from indirect irradiation (such as by stray radiation and secondary radiation). For example, the scintillation elements can be disposed in a housing (for example, of aluminium) the end faces to be read out then remain uncovered, but the housing may enclose the radiation entrance faces. It may be advantageous to construct the scintillation elements as light conductors; in order to ensure that an as large part as possible of the scintillation light is effectively intercepted, for this purpose scintillation material, for example, is embedded in or is locally added to a glassy support having a shape adapted for optimum light conduction. For the sake of clarity, FIG. 1 shows only a single row of scintillation elements, but in practical detection devices in accordance with the invention it may be advantageous to use a plurality of rows of scintillation elements which are preferably staggered with respect to each other. For example, FIG. 2 is a sectional view, taken parallel to a plane of incidence of the radiation to be detected, of an embodiment comprising two rows of scintillation elements. Any desired shape, for example, square, rectangular, round, triangular, elliptical, etc., can be used for the section of the scintillation elements for reasons of optimum radiation absorption, light yield or price.

Partitions can be provided between the scintillation elements in order to reduce the adverse effect of stray radiation, in addition to reducing cross-talk between the scintillation elements themselves. The partitions are arranged parallel to the direction of the incident radiation and act as collimators for stray radiation. These partitions may form part of the envelopes of the scintillation elements and may be extended beyond the scintillation elements in the direction of the radiation source in order to serve as a collimator for the incident radiation. Moreover, an additional, separate collimator can be added, the apertures thereof being adapted to the geometry of the scintillation elements.

In the embodiment shown, the supporting plates 3 and 5 are provided with bores 9 wherethrough ends of the scintillation elements project, (for example, as far as beyond the outer surfaces) of the supporting surfaces. Thus, firm mounting of the scintillation elements is ensured. Each of the scintillation elements is read out on only one side in this embodiment, i.e. alternately per group of elements on the lower side and the upper side thereof (viewed in the drawing). The bores 9 in the supporting plates preferably do not extend through the entire supporting plate for end faces of the elements which are not to be read out.

The detector faces 7 of the scintillation elements can be directly coupled, possibly with a suitable intermediate immersion liquid, to a measuring element for measuring the scintillation light. However, it may be advantageous to insert an optical conductor whereby, the light can be collimated or dispersed. It is possible to realize a transverse displacement, for example, by way of a fibre-optical light conductor so that a more advantageous geometry for the detection of the scintillation light can be chosen at random. Instead of a fibre-optical light conductor, use can alternatively be made of an elliptical light conductor. A face of the scintillation element is then preferably fixed as well as possible around a first focal point of the ellipsoid and the radiation measuring element has an entrance face situated near the second focal point. Alternatively, the scintillation element itself may be constructed as an ellipsoid. A concentration of scintillation material is then provided around its first focal point and the entrance window for the light measuring is mounted around the second focal point. Use can thus be made of scintillation elements wherein the scintillation material is embedded in a non-absorbing support. When use is made of light conductor elements between each scintillation element and the measuring device for the scintillation light, a single row of scintillation elements can be replaced by a plurality of adjacently situated rows of measuring windows, so that more space is available for further light detection and crosstalk can be further reduced. FIG. 2 shows a preferred embodiment in which a single row of scintillation elements 31 disposed in light conductors 33 provides four rows of light detection elements 35. Two rows of light channels are adjacently arranged and two rows are arranged one opposite the other. A multichannel detector can thus be construed with plurality of these foursomes arranged one behind the other in a direction transversely of the plane of the drawing. The scintillation material 31 is again concentrated around one of the focal points in each of the light conductors. It may be advantageous to form the light conductors from one of the fluorescent materials as described in U.S. patent application Ser. No. 885,669, so that the radiation yield can be increased without giving rise to distributing afterglow. In FIG. 2, all four light conductors are situated one behind the other in a single row at the area of the scintillation material 31 and the measuring devices 35 may all be situated in one plane or staggered with respect to each other.

In the embodiment shown, the scintillation elements are group-wise read out, alternately on each side. However, it is alternatively possible, by displacement of the entrance windows with respect to the scintillation elements, to read out all scintillation elements on one side by light conductors. In a further preferred embodiment in accordance with the invention, scintillation elements are read out on two sides. For example, both signals from a scintillation element can then be combined at option, but the signals can also be separately used, thus enabling simultaneous measurement of two slices of an object being examined. If desired, the scintillation element can be divided in two by a partition which is preferably arranged halfway along its length.

The measuring devices for measuring the light produced in the scintillation elements are group-wise combined in modules 11 in the preferred embodiment shown. A module of this kind comprises, for example, nine channels which are arranged as shown in FIG. 3, so in this case an entrance window 13 is situated directly in front of each scintillation element 1. The inner side of each entrance windows 13 is provided with a cathode 15 (FIG. 1) which is sensitive to the scintillation light. An entrance plate 17 of the modules may be made of metal as well as glass, preference being given to glass, or at least an electrical insulator which can be metallized internally and externally, if desired. The windows 13 are provided in this entrance plate (in the case of a metal entrance plate, they are separate transmitting windows, while in the case of a glass plate they are formed by recesses which are integral with the plate). Preferably, the windows are constructed to be concave on the inner side, i.e. the side where the photocathode is mounted. When use is made of glass supporting plates, these plates are preferably constructed to be absorbing for the relevant scintillation light between the windows to minimize crosstalk. In a preferred embodiment, the windows and the supporting plate are made of glass having a comparatively high diffraction index. The windows may be sealed in the supporting plate as separate plates; an optical barrier may then be included between the windows and the supporting plate. The photocathodes can be formed together as modules in the housing. The inner side 20 of the entrance plate is then provided at least in the regions between the windows, if necessary, with an electrically conductive layer which is light-impermeable.

FIG. 4 shows a further preferred embodiment of a detector module 11 which comprises sixteen measuring channels 13 disposed so that a scintillation element is directly associated with each measuring channel and is irradiated only by the X-radiation to be detected in that channel. Therein, the connection between the windows of successive modules is not seamless, i.e. without disturbance of the mutually equal distances between the windows. Thus, in a sixteen element, four-row module, the effective distance between the windows of two modules which are situated opposite each other at an angle amounts to either 3 times or to 5 times the minimum distance between windows in the row direction. The figure shows that this construction enables efficient use of the space inside the module housing. If the use of four rows of scintillation elements is objectionable, this window orientation can still be maintained by adopting this window configuration on the basis of one or two rows of scintillation elements and by using light conductors.

An electron detector 19 which is shielded by an aperture plate 21, except for a sensitive surface area 23 is arranged opposite each of the photocathodes. The aperture plate 21 can also serve as a high voltage electrode for accelerating the photoelectrons released by the photocathode. A signal recording device 25 (diagrammatically shown in the vicinity of the electron detectors) records signals derived from the electron detector and supplies the signals, preferably after conversion from a parallel input format to a serial output format, for further processing in subsequent electronic circuits (not shown).

Suitable focussing of the photocathodes 15 on the electron detectors 19 can be achieved, for a given distance between the photocathodes 15 and the aperture plate 21 and a given accleration voltage, by suitable shaping of the photocathode and the edge thereof, without further electron-optical elements being required. A sleeve 27 together with the entrance plate, comprises a vacuum tight box in which a customary pressure for image intensifier tubes prevails. Each of these boxes or modules is detachably connected to the supporting plates 3 and 5, the windows 13 being situated opposite the relevant end faces 7 of the scintillation elements. This method of mounting does not require very high accuracy; thus, adjustment (within, for example, approximately 0.5 mm) with respect to the supporting plate may be realized, for example, by way of ridges 29 provided thereon. When the entrance windows and the scintillation elements are assembled, an immersion oil, a polyimide film, a silicon film, and/or a ductile transparent rubber layer of a similar material may be provided therebetween in order to increase the radiation transmission. The diffraction index ($N_l$) of the contact material is preferably higher than that ($N_k$) of the scintillation element and lower than that ($N_v$) of the window. The window use is preferably made of a material having an as high as possible diffraction index. It is also advantageous to construct the window to be as thin as possible because additional radiation loss due to a thick window may give rise to cross-talk. A suitable material for the entrance plate, with regard to the formability as well as strength, is the so-termed glassy carbon. The preferably round windows of the photocathodes may have a diameter of, for example, from 5 to 10 mm and a spacing of from at least 1 to 5 mm. The distance between the photocathodes and the electron detectors is, for example, from 5 to 10 mm and the aperture for each of the electron detectors has a diameter of approximately 1.5 mm.

In a further preferred embodiment, the scintillation elements are integral with the light detectors and the photocathodes are arranged, for example, directly on the read out faces of the scintillation elements. The shape of the scintillation elements and the exit windows thereof can then be adapted to the desired shaped of the photocathodes. The electron detectors are preferably formed so that a comparatively thin diffusion layer occurs as a detection transition, because at this area the energy loss for the photoelectrons to be detected is minimum. For a detailed description of this type of electron detector, reference is made to the article Electron Bombarded Semiconductor Devices, proc. IEEE, vol. 62, No. 8, 1974, pages 1119–1158. The electron detector should furthermore be properly shielded, notably against alkali elements such as Cs, Na, K and the like which may be released during the formation of the photocathodes. Shielding may be provided by constructing of the detector with a cover layer which is impermeable to the contaminating materials (such as by nitrification) or found by arranging the detector so that the pn transition therein is situated on a side which is remote from the entrance side. The contaminating substances have more difficulty in reaching the pn transition. The surface to be struck by the electron beam can also be shielded.

In preferred embodiments of the invention, the photocathodes are formed after the remainder of the module has been completely assembled, i.e. after the mounting of the electron detectors. The amount of alkali elements released is much larger during the photocathode formation than during later operation; this makes the formation by transfer techniques attractive, notably in embodiments where semiconductors are not well shielded. Also in the case of properly shielded semiconductor detectors (for example semiconductor detectors shielded by means of nitrification) the risk of contamination may be further reduced by maintaining the diodes outside the atmosphere prevailing during the formation of the photocathode. In accordance with a preferred method of assembling detector modules in accordance with the invention, the electron detectors are covered by removable shields during the formation of the photocathode in order to avoid a comparatively complex and expensive transfer techniques. An aperture plate 21 with comparatively small apertures for each of the electron detectors readily permits such shielding. For example, a double construction aperture plate, which opens and closes the apertures by relative displacement. Alternatively, a thin foil may be arranged across the aperture plate, said foil being either removed after the formation of the photocathodes or being suitably transparent for the electrons to be detected. A comparatively favorable method utilizes spheres which close the apertures during the formation and which are subsequently removed via an exhaust tube.

FIG. 5 shows a modular construction where the scintillation elements 1 form part of a module. A slide 51 is rigidly connected to a block 55 which comprises pin holes 57 for adjustment of the module. A recess 61 in a block 63 supports a slide for scintillation elements and enables unimpeded linking of blocks in conjunction with a corresponding recess 65 in the block 55. The recess 65 may be shaped as an arc of a circle. Further slides with scintillation elements can be connected in succession on both sides of the module in a recess 69 in the block 55 and in a recess 71 in the block 63. The construction of the slides with scintillation elements is such that for two rows of scintillation elements a seamless transition is realized between the slides. A module like the module 11 shown in FIG. 3 can be provided in each of the blocks with a suitable fit, preferably by means of abutment faces.

The detection channels in each of the modules then adjoin the scintillation elements provided in a slide. This results in an attractive modular construction of a detector device in which the scintillation elements are also arranged in modular fashion. An advantage is thus obtained in that, besides an accurate fit between scintillation elements and photocathode windows, the entire series of scintillation elements need not be replaced or remounted if one scintillation element becomes defective, for example, during mounting. 9 or 16 channels can again be accommodated per module. However, it is alternatively possible to choose a higher or lower number, even though the possibilities are limited if seamless connection as well as identical modules for detectors comprising scintillation elements to be read out on two sides and module rows situated opposite each other are to be realized.

A detector in accordance with the invention is particularly suitable for use in a scanning X-ray examining device for medical diagnosis. A device of this kind, comprising a detector in accordance with the invention, is diagrammatically shown in FIG. 6. a device of this kind comprises an X-ray source 70 for generating, for example, a flat fan-shaped X-ray beam 71. The aperture angle of the beam 71 is usually so large that a part of a body 73 to be examined, situated on a supporting plate 72, is completely covered thereby. After having passed through the body being examined, the intensity of the beam is locally measured by a detector 74 in accordance with the invention. The detector in this case comprises, for example, 300 measuring channels, that is to say 300 different photocathodes with associated electron detectors. The reading out of the detectors can be performed as in known devices of this kind, it being possible to use substantially simpler and hence more reliable and cheaper electronic circuits in view of the high internal intensification of the detectors. A comparatively large number of modules may still be combined for constructing a detector comprising a number of detection cells, which number can be further extended until, for example, a circular detector is obtained. To this end, use can be made of a building system as previously described, but it is alternatively possible to use a system comprising two slightly different, for example, mirror-symmetrical, holders for the scintillation elements. Either identical modules or two different, preferably mirror-symmetrical, modules, can be added thereto. The X-ray source can be arranged to be rotatable around the body to be examined. In prior art devices, the detector is usually moved along in synchronism during this rotation. In order to realize this movement, the X-ray source is arranged to be rotatable in a support 76 by way of a movement mechanism 75.

The manufacture of the nitrated semiconductor electron detector according to the invention is described with reference to FIGS. 7 to 11. Starting material (see FIG. 7) is an n-type silicon plate 80 having a resistivity of, for example, 7 Ohm cm. An oxide layer 81, approximately 0.5 micron thick, is provided on said plate by thermal oxidation. An annular slot 82 for example, with a width of 30 microns and outside diameter of 2.5 mm is etched in said oxide layer. However, if desired, said annular slot may alternatively have a closed shape different from a circle and may, for example, be a square.

A layer 83 of polycrystalline silicon is then deposited in a thickness of approximately 0.5 micron, for example, from a atmosphere containing $SiH_4$ and $N_2$ at 0.5 Torr and 650° C., which layer 83 is then doped with boron, for example by diffusion or ion implantation, after which, during a further diffusion, step the boron diffuses from the doped polycrystalline silicon into the silicon substrate 80 to form the annular p-type zone 84. The structure shown in FIG. 7 is then obtained. The zone 84 has a depth of 1.5–2 microns and a sheet resistance of approximately 200 Ohms per square.

The polycrystalline silicon 83 is then given its ultimate shape in the usual manner by etching, after which the part of the oxide layer 81 situated within the zone 84 is removed by etching.

A 0.04 micron thick oxide layer 85 is then formed (see FIG. 8) by thermal oxidation, on which an aproximately 0.05 micron thick layer 86 of silicon nitride is deposited by deposition from an atmosphere containing $SiH_4$, $NH_3$ and $H_2$ at normal pressure at approximately 1050° C. Finally, a 0.2 micron thick silicon oxide layer 87 is deposited hereon so that the structure shown in FIG. 8 is obtained.

After removing layers formed on the lower side of the silicon plate 80 during the preceding operations, a gettering step is carried out by heating in an atmosphere containing $POCl_3$ at 1000° C., succeeding by heating in nitrogen at 1050°0 C. for 1 hour. A highly doped n-type layer 88 is obtained, see FIG. 9. Contact windows are then defined in the oxide layer 87, after which the nitride layer 86 is etched away within said windows. The oxide layer 85 within the window is then etched away in a further etching step simultaneously with the oxide layer 87.

A thin p-type layer 89, see FIG. 9, is formed by ion implantation of boron ions via the layers 85 and 86 within the annular zone 84. The ion dosis is, for example, $4.10^{13}$ ions per $cm^2$, the implantation energy is 35 KeV. After providing metal contacts 90 and 91, for example of aluminium, on the n+ type layer 88 and via the contact windows in the layers 85 and 86 on the polycrystalline silicon layer 83, the electron detectors is ready for assembly.

As a modified embodiment of the described structure, a groove may be etched in the silicon substrate 80 at the area of the slot 82 in the oxide layer 81, as is shown in FIG. 10. By subsequently using the same operations as illustrated with reference to FIGS. 7 to 9, the structure shown in FIG. 11 is obtained in which corresponding reference numerals are assigned to the components corresponding to those of FIGS. 7 to 9. The advantage of this structure is that X-ray radiation generated by electrons near the p-n junction between the layer 89 and the substrate 80 is absorbed by the metal layers 90 present in the groove so that they cannot penetrate into the oxide layer 81 and introduce annoying oxide charge there.

What is claimed is:

1. A method for manufacturing a radiation detector of the type which comprises a photocathode which is disposed on an entrance window, an electron detector including a semiconductor junction, and means, including a perforated aperture plate disposed between the entrance window and the electron detector, which transmit electrons from the photocathode to the electron detector; comprising the steps of:

first assembly the entrance window and electron detector to the means which transmit electrons;
then covering one or more perforations in the aperture plate with removable spherical shield(s);
then forming the photocathode on the surface of the entrance window; and
then removing the spherical shield(s).

* * * * *